(12) United States Patent
Marchese et al.

(10) Patent No.: US 12,736,989 B2
(45) **Date of Patent: *Sep. 15, 2026**

(54) MICROELECTROMECHANICAL SENSOR DEVICE WITH IMPROVED POWER CONSUMPTION

(71) Applicant: STMicroelectronics International N.V., Geneva (CH)

(72) Inventors: Carmela Marchese, Milan (IT); Salvatore Poli, Milan (IT)

(73) Assignee: STMicroelectronics International N.V., Geneva (CH)

( * ) Notice: Subject to any disclaimer, the term of this patent is extended or adjusted under 35 U.S.C. 154(b) by 337 days.

This patent is subject to a terminal disclaimer.

(21) Appl. No.: 18/509,105

(22) Filed: Nov. 14, 2023

(65) Prior Publication Data

US 2024/0201717 A1 Jun. 20, 2024

(30) Foreign Application Priority Data

Dec. 14, 2022 (IT) ........................ 102022000025626

(51) Int. Cl.
*G05F 1/46* (2006.01)
*G01D 11/00* (2006.01)

(52) U.S. Cl.
CPC ............... *G05F 1/46* (2013.01); *G01D 11/00* (2013.01)

(58) Field of Classification Search
CPC ....... G01L 9/0073; G01L 9/0042; G01L 1/18; G01L 9/0072; G01L 9/0054; G01L 9/12; G01L 19/147; G01L 19/0092; G01L 9/0052; G01L 9/06; G01L 19/04; G01L 19/148; G01L 3/025; G01L 9/0055; G01L 1/16; G01L 1/142; G01L 9/0045; G01L 19/0084; G01L 19/14; G01L 19/0627; G01L 1/148; G01L 19/143; G01L 19/0038; G01L 19/0069; G01L 9/00; G01L 9/0041;

(Continued)

(56) References Cited

U.S. PATENT DOCUMENTS 8,601,302 B2 12/2013 Lachwani et al.
9,037,890 B2 5/2015 De Caro et al.
(Continued)

FOREIGN PATENT DOCUMENTS

CN 104949667 A * 9/2015 .......... G01P 15/0802
GB 2564434 A * 1/2019 ................ H02J 4/00
(Continued)

*Primary Examiner* — Andre J Allen
(74) *Attorney, Agent, or Firm* — Seed Intellectual Property Law Group LLP

(57) ABSTRACT

A microelectromechanical sensor device has a detection structure and an associated electronic circuitry; the electronic circuitry receives, when the microelectromechanical sensor device is powered, an external power supply voltage and is provided with a voltage regulator which generates a regulated voltage having a different value from the external power supply voltage and at least one voltage domain powered by the regulated voltage. The electronic circuitry has a power supply management core, always powered by the external power supply voltage and controlling the voltage regulator to interrupt power supply to the voltage domain and implement a first power-down condition of the microelectromechanical sensor device.

20 Claims, 4 Drawing Sheets

(58) Field of Classification Search
CPC ....... G01L 9/0048; G01L 1/14; G01L 9/0047; G01L 15/00; G01L 19/0618; G01L 19/0645; G01L 1/2293; G01L 19/06; G01L 9/04; G01L 1/26; G01L 19/00; G01L 19/141; G01L 1/22; G01L 27/002; G01L 5/162; G01L 27/007; G01L 1/20; G01L 9/08; G01L 25/00; G01L 9/008; G01L 19/0654; G01L 27/005; G01L 7/08; G01L 9/125; G01L 9/0051; G01L 19/0061; G01L 5/228; G01L 9/02; G01L 9/065; G01L 1/146; G01L 19/146; G01L 9/0019; G01L 1/144; G01L 19/0046; G01L 9/0079; G01L 1/2287; G01L 19/0007; G01L 19/142; G01L 13/06; G01L 1/2262; G01L 19/0076; G01L 1/205; G01L 13/026; G01L 19/02; G01L 9/0044; G01L 27/00; G01L 9/0075; G01L 19/0636; G01L 1/242; G01L 1/00; G01L 1/2206; G01L 7/082; G01L 13/00; G01L 9/0016; G01L 1/24; G01L 11/02; G01L 17/00; G01L 1/10; G01L 5/165; G01L 1/005; G01L 11/025; G01L 1/125; G01L 19/069; G01L 19/0672; G01L 1/162; G01L 19/145; G01L 9/16; G01L 19/007; G01L 1/12; G01L 5/00; G01L 1/2281; G01L 19/0681; G01L 1/246; G01L 11/00; G01L 9/0005; G01L 5/16; G01L 19/0609; G01L 5/226; G01L 9/005; G01L 1/04; G01L 9/0022; G01L 2019/0053; G01L 21/12; G01L 21/22; G01L 23/18; G01L 19/086; G01L 9/0098; G01L 19/149; G01L 5/0052; G01L 1/183; G01L 19/003; G01L 5/1627; G01L 11/002; G01L 13/02; G01L 9/0025; G01L 7/00; G01L 9/006; G01L 1/106; G01L 1/127; G01L 5/0028; G01L 1/02; G01L 1/2231; G01L 9/0001; G01L 1/225; G01L 1/247; G01L 21/00; G01L 9/007; G01L 9/045; G01L 1/2268; G01L 23/221; G01L 11/04; G01L 19/12; G01L 23/225; G01L 9/0008; G01L 9/0002; G01L 5/0038; G01L 1/165; G01L 9/0082; G01L 9/085; G01L 23/22; G01L 9/025; G01L 3/102; G01L 5/24; G01L 19/0023; G01L 9/001; G01L 9/14; G01L 2009/0066; G01L 5/161; G01L 5/166; G01L 1/241; G01L 3/108; G01L 5/167; G01L 9/0076; G01L 1/122; G01L 9/002; G01L 9/0027; G01L 9/0064; G01L 1/044; G01L 19/083; G01L 1/2218; G01L 1/25; G01L 5/22; G01L 1/255; G01L 21/10; G01L 9/10; G01L 5/0019; G01L 5/0061; G01L 9/0095; G01L 19/144; G01L 23/10; G01L 9/003; G01L 5/169; G01L 19/08; G01L 23/16; G01L 3/105; G01L 5/0042; G01L 7/022; G01L 7/086; G01L 7/088; G01L 1/103; G01L 17/005; G01L 5/0057; G01L 5/0076; G01L 5/164; G01L 23/12; G01L 23/24; G01L 3/10; G01L 5/14; G01L 9/0013; G01L 11/008; G01L 23/08; G01L 5/223; G01L 1/086; G01L 19/0015; G01L 1/2225; G01L 21/14; G01L 5/008; G01L 1/167; G01L 11/06; G01L 23/26; G01L 5/04; G01L 9/0086; G01L 1/2243; G01L 13/023; G01L 23/125; G01L 3/101; G01L 5/0004; G01L 5/0009; G01L 5/10; G01L 5/221; G01L 5/243; G01L 7/102; G01L 9/0007; G01L 9/0011; G01L 9/0058; G01L 9/0089; G01L 1/243; G01L 3/04; G01L 5/0047; G01L 5/28; G01L 7/18; G01L 1/248; G01L 5/0033; G01L 9/0017; G01L 23/222; G01L 3/06; G01L 5/103; G01L 2224/48091; G01L 2924/00014; G01L 2924/1461; G01L 2924/00; G01L 2224/73265; G01L 2224/48137; G01L 2924/0002; G01L 2224/48247; G01L 2924/181; G01L 2224/48227; G01L 24/48; G01L 2224/16225; G01L 2924/00012; G01L 2924/16152; G01L 2224/32225; G01L 2224/32145; G01L 2224/48465; G01L 24/73; G01L 2924/14; G01L 2924/10253; G01L 2924/15151; G01L 2224/48145; G01L 24/32; G01L 2924/1815; G01L 2924/01079; G01L 2224/49175; G01L 24/16; G01L 2224/05554; G01L 2224/45144; G01L 2924/3025; G01L 2224/49171; G01L 25/0657; G01L 2924/16151; G01L 2924/15311; G01L 2924/1433; G01L 23/481; G01L 24/45; G01L 24/20; G01L 24/05; G01L 2924/16195; G01L 24/97; G01L 2224/45099; G01L 2924/16235; G01L 24/49; G01L 24/83; G01L 2224/8592; G01L 23/3121; G01L 21/56; G01L 2924/014; G01L 2924/01029; G01L 23/3107; G01L 2924/01033; G01L 2924/01322; G01L 24/17; G01L 2924/09701; G01L 24/28; G01L 2224/32245; G01L 2224/73204; G01L 2224/16227; G01L 2924/01078; G01L 21/67253; G01L 2224/73253; G01L 24/29; G01L 2924/01006; G01L 2224/0401; G01L 2224/04105; G01L 2224/94; G01L 2224/16245; G01L 2924/381; G01L 24/92; G01L 25/50; G01L 2224/16145; G01L 2224/16; G01L 24/85; G01L 2924/01082; G01L 2924/01005; G01L 22/12; G01L 2924/19105; G01L 2224/04042; G01L 23/04; G01L 2224/45015; G01L 25/167; G01L 23/02; G01L 2924/19041; G01L 23/49575; G01L 2924/13091; G01L 2224/48472; G01L 23/13; G01L 23/3135; G01L 24/13; G01L 2924/01013; G01L 2924/15153; G01L 2224/2919; G01L 2224/131; G01L 25/16; G01L 21/76898; G01L 2224/48106; G01L 21/565; G01L 24/81; G01L 21/02565; G01L 21/6835; G01L 2924/01047; G01L 23/49541; G01L 24/19; G01L 2924/19107; G01L 21/50; G01L 21/561; G01L 2224/11; G01L 2924/12044; G01L 21/568; G01L 2924/15787; G01L 21/02554; G01L 2924/12042; G01L 2924/3011; G01L 2224/92247; G01L 2224/45147; G01L 2224/97; G01L 22/30; G01L 2924/01068; G01L 2224/05599; G01L 2221/68327; G01L 23/49838; G01L 24/11; G01L 2924/01014; G01L 2924/0105; G01L 2224/48463; G01L 2224/49109; G01L 23/053; G01L 24/94; G01L 25/0655; G01L 2924/207; G01L 2224/05548; G01L 2224/18; G01L 24/03; G01L 22/26; G01L 2224/81801; G01L 23/528; G01L 21/78; G01L 2224/05573; G01L 23/315; G01L 2924/10158; G01L 21/02; G01L 21/02532; G01L 2224/291; G01L 23/564; G01L 24/02; G01L 21/6836; G01L 23/562; G01L 24/06; G01L 25/165; G01L 2934/19043; G01L 2924/16251; G01L 2924/15192; G01L 21/02631; G01L 21/67288; G01L 2224/05624; G01L 2224/13111; G01L 2224/73257; G01L 2924/30105; G01L 23/3114; G01L 24/24; G01L 2224/12105; G01L 2224/48464; G01L 2224/05571; G01L 2224/45124; G01L 23/055; G01L 21/3065; G01L 2224/05644; G01L 24/80; G01L 2224/13147; G01L 2224/29011; G01L 2224/85; G01L 23/057; G01L 23/3185; G01L 24/08; G01L 2924/15788; G01L 23/552; G01L 23/58; G01L 2924/01004; G01L 21/30604; G01L 21/67242; G01L 2224/73267; G01L 23/48; G01L 23/49816; G01L 2924/01327; G01L 23/3157; G01L 23/345; G01L 23/49861; G01L 23/544; G01L 2924/01019; G01L 2924/01023; G01L 2924/01074; G01L 2224/83805; G01L 23/576; G01L 22/14; G01L 22/34; G01L 2224/73215; G01L 2224/83; G01L 2225/06513; G01L 23/31; G01L 2924/01075; G01L 21/563; G01L 23/49827; G01L 2224/05647; G01L 2224/13144; G01L 2224/8385; G01L 23/5389; G01L 2924/01015; G01L 2924/19042; G01L 21/52; G01L 2221/68381; G01L 2224/0557; G01L 2224/24137; G01L 2224/73207; G01L 2924/1305; G01L 23/5226; G01L 21/31111; G01L 2224/05568; G01L 2224/13101; G01L 2224/32014; G01L 2224/92244; G01L 23/00; G01L 23/5387; G01L 2924/10155; G01L 2224/02379; G01L 2224/13; G01L 2224/13099; G01L 2225/06541; G01L 2924/18162; G01L 21/02422; G01L 21/67092; G01L 2224/16235; H01L 2224/48091; H01L 2924/00014; H01L 2924/1461; H01L 2924/00; H01L 2224/73265; H01L 2224/48137; H01L 2924/0002; H01L 2224/48247; H01L 2924/181; H01L 2224/48227; H01L 24/48; H01L 2224/16225; H01L 2924/00012; H01L 2924/16152; H01L 2224/32225; H01L 2224/32145; H01L 2224/48465; H01L 24/73; H01L 2924/14; H01L 2924/10253; H01L 2924/15151; H01L 2224/48145; H01L 24/32; H01L 2924/1815; H01L 2924/01079; H01L 2224/49175; H01L 24/16; H01L 2224/05554; H01L 23/10; H01L 2224/45144; H01L 2924/3025; H01L 2224/49171; H01L 25/0657; H01L 2924/16151; H01L 2924/15311; H01L 2924/1433; H01L 23/481; H01L 24/45; H01L 24/20; H01L 24/05; H01L 2924/16195; H01L 24/97; H01L 2224/45099; H01L 2924/16235; H01L 24/49; H01L 24/83; H01L 2224/8592; H01L 23/3121; H01L 21/56; H01L 2924/014; H01L 2924/01029; H01L 23/3107; H01L 2924/01033; H01L 2924/01322; H01L 24/17; H01L 2924/09701; H01L 24/28; H01L 2224/32245; H01L 2224/73204; H01L 2224/16227; H01L 2924/01078; H01L 21/67253; H01L 2224/73253; H01L 24/29; H01L 2924/01006; H01L 2224/0401; H01L 2224/04105; H01L 2224/94; H01L 2224/16245; H01L 2924/381; H01L 24/92; H01L 25/50; H01L 2224/16145; H01L 2224/16; H01L 24/85; H01L 2924/01082; H01L 2924/01005; H01L 22/12; H01L 2924/19105; H01L 2224/04042; H01L 23/04; H01L 2224/45015; H01L 25/167; H01L 23/02; H01L 2924/19041; H01L 23/49575; H01L 2924/13091; H01L 2224/48472; H01L 23/13; H01L 23/3135; H01L 24/13; H01L 2924/01013; H01L 2924/15153; H01L 224/2919; H01L 2224/131; H01L 25/16; H01L 21/76898; H01L 2224/48106; H01L 21/565; H01L 24/81; H01L 21/02565; H01L 21/6835; H01L 2924/01047; H01L 23/49541; H01L 24/19; H01L 2924/19107; H01L 21/50; H01L 21/561; H01L 2224/11; H01L 2924/12044; H01L 21/568; H01L 2924/15787; H01L 21/02554; H01L 2924/12042; H01L 2924/3011; H01L 2224/92247; H01L 2224/45147; H01L 2224/97; H01L 22/30; H01L 2924/01068; H01L 2224/05599; H01L 2221/68327; H01L 23/49838; H01L 24/11; H01L 2924/01014; H01L 2924/0105; H01L 2224/48463; H01L 2224/49109; H01L 23/053; H01L 24/94; H01L 25/0655; H01L 2924/207; H01L 2224/05548; H01L 2224/18; H01L 24/03; H01L 21/00; H01L 22/26; H01L 2224/81801; H01L 23/528; H01L 21/78; H01L 2224/05573; H01L 23/24; H01L 23/315; H01L 2924/10158; H01L 21/02; H01L 21/02532; H01L 2224/291; H01L 23/564; H01L 24/02; H01L 21/6836; H01L 23/562; H01L 24/06; H01L 25/165; H01L 2924/19043; H01L 2924/16251; H01L 23/26; H01L 2924/15192; H01L 21/02631; H01L 21/67288; H01L 2224/05624; H01L 2224/13111; H01L 2224/73257; H01L 2924/30105; H01L 23/3114; H01L 24/24; H01L 2224/12105; H01L 2224/48464; H01L 2224/05571; H01L 2224/45124; H01L 23/055; H01L 21/3065; H01L 2224/05644; H01L 24/80; H01L 2224/13147; H01L 2224/29011; H01L 2224/85; H01L 23/057; H01L 23/3185; H01L 24/08; H01L 2924/15788; H01L 23/552; H01L 23/58; H01L 2924/01004; H01L 21/30604; H01L 21/67242; H01L 2224/73267; H01L 23/08; H01L 23/48; H01L 23/49816; H01L 2924/01327; H01L 23/3157; H01L 23/345; H01L 23/49861; H01L 23/544; H01L 2924/01019; H01L 2924/01023; H01L 2924/01074; H01L 2224/83805; H01L 23/576; H01L 22/14; H01L 22/34; H01L 2224/73215; H01L 2224/83; H01L 2225/06513; H01L 23/31; H01L 2924/01075; H01L 21/563; H01L 23/16; H01L 23/49827; H01L 2224/05647; H01L 2224/13144; H01L 2224/8385; H01L 23/5389; H01L 2924/01015; H01L 2924/19042; H01L 21/52; H01L 2221/68381; H01L 2224/0557; H01L 2224/24137; H01L 2224/73207; H01L 2924/1305; H01L 23/5226; H01L 21/31111; H01L 2224/05568; H01L 2224/13101; H01L 2224/32014; H01L 2224/92244; H01L 23/00; H01L 3/5387; H01L 2924/10155; H01L 2224/02379; H01L 2224/13; H01L 2224/13099; H01L 2225/06541; H01L 2924/18162; H01L 21/02422; H01L 21/67092; H01L 2224/16235; H01L 2224/45169; H01L 23/293; H01L 23/49548; H01L 2924/18161; H01L 2221/68359; H01L 2221/68372; H01L 23/34; H01L 25/0652; H01L 2924/01032; H01L 21/2007; H01L 2224/02372; H01L 2224/81193; H01L 2224/83193; H01L 23/12; H01L 23/28; H01L 23/3171; H01L 23/49822; H01L 23/4985; H01L 24/09; H01L 2924/00011; H01L 2924/01057; H01L 2924/13055; H01L 21/02628; H01L 21/68; H01L 2224/0239; H01L 2224/33181; H01L 2224/48245; H01L 2224/81191; H01L 2924/12041; H01L 2924/351; H01L 21/0274; H01L 21/6831; H01L 2224/05001; H01L 2224/13025; H01L 2224/81; H01L 2224/85399; H01L 23/29; H01L 25/18; H01L 2924/3511; H01L 21/76877; H01L 2224/05655; H01L 2224/08145; H01L 224/13022; H01L 2224/4813; H01L 2224/48257; H01L 2224/4911; H01L 2225/0651; H01L 23/3128; H01L 23/5383; H01L 24/26; H01L 24/46; H01L 25/065; H01L 2924/01049; H01L 2924/07802; H01L 21/02381; H01L 2224/24226; H01L 2224/29124; H01L 2224/81815; H01L 23/522; H01L 2924/0102; H01L 2924/01024; H01L 2924/01077; H01L 2924/30107; H01L 21/67259; H01L 22/20; H01L 2224/03; H01L 2224/13024; H01L 2224/48095; H01L 23/49811; H01L 24/82; H01L 2924/01087; H01L 2924/12043; H01L 21/0273; H01L 21/26513; H01L 21/302; H01L 21/6833; H01L 21/764; H01L 2224/0345; H01L 2224/05553; H01L 2224/48225; H01L 2224/48471; H01L 23/3142; H01L 23/4952; H01L 2924/01022; H01L 924/01028; H01L 2924/0132; H01L 2924/15313; H01L 21/02164; H01L 21/027; H01L 21/31116; H01L 21/566; H01L 21/67069; H01L 21/67248; H01L 21/76838; H01L 2223/54426; H01L 2224/0556; H01L 2224/45014; H01L 2224/48229; H01L 2224/83192; H01L 24/27; H01L 24/34; H01L 924/04941; H01L 2924/07811; H01L 21/30625; H01L 21/67276; H01L 21/76811; H01L 2224/05008; H01L 2224/0554; H01L 2224/05552; H01L 224/05572; H01L 2224/13139; H01L 2224/4917; H01L 2224/80896; H01L 2224/83825; H01L 23/043; H01L 23/49805; H01L 24/33; H01L 25/00; H01L 2924/10156; H01L 2924/10157; H01L 2924/15747; H01L 2924/16153; H01L 21/02603; H01L 21/0262; H01L 21/30608; H01L 21/4853; H01L 21/4857; H01L 21/6719; H01L 21/76879; H01L 2224/13124; H01L 2224/13155; H01L 2224/29111; H01L 2224/4824; H01L 224/83385; H01L 2224/83801; H01L 23/36; H01L 23/49503; H01L 23/5386; H01L 24/12; H01L 24/75; H01L 25/072; H01L 2924/0103; H01L 2924/10161; H01L 2924/15321; H01L 21/02592; H01L 21/02614; H01L 21/02675; H01L 21/02691; H01L 21/28; H01L 21/304; H01L 21/31053; H01L 21/324; H01L 21/4803; H01L 21/6838; H01L 2224/05124; H01L 2224/29013; H01L 2224/29082; H01L 2224/29144; H01L 2224/49113; H01L 2224/83007; H01L 23/291; H01L 24/00; H01L 2924/0665; H01L 2924/146; H01L 2924/15174; H01L 21/02126; H01L 21/266; H01L 21/48; H01L 21/4821; H01L 21/67011; H01L 21/76802; H01L 22/32; H01L 2221/6834; H01L 2224/023; H01L 2224/02313; H01L 2224/03452; H01L 2224/24227; H01L 2224/29147; H01L 2224/29599; H01L 2224/73227; H01L 2224/80895; H01L 2224/81192; H01L 2224/83191; H01L 2224/92124; H01L 2224/92164; H01L 23/49558; H01L 2924/01039; H01L 2924/1306; H01L 2924/17747; H01L 2924/19106; H01L 21/02472; H01L 21/02483; H01L 21/02488; H01L 21/486; H01L 1/7684; H01L 22/10; H01L 2221/68345; H01L 2224/0235; H01L 2224/02371; H01L 2224/02373; H01L 2224/05611; H01L 2224/05669; H01L 2224/13082; H01L 2224/13109; H01L 2224/13116; H01L 2224/29155; H01L 2224/48228; H01L 2224/48235; H01L 2224/73203; H01L 2224/73251; H01L 2224/9222; H01L 23/147; H01L 23/495; H01L 23/525; H01L 23/585; H01L 23/66; H01L 24/95; H01L 2924/01046; H01L 2924/20752; H01L 21/0254; H01L 21/30655; H01L 21/32056; H01L 21/76264; H01L 2223/54486; H01L 2224/0231; H01L 2224/05147; H01L 2224/19; H01L 2224/29099; H01L 2224/29139; H01L 2224/2929; H01L 2224/32058; H01L 2224/37099; H01L 2224/4848; H01L 2224/48624; H01L 2224/49173; H01L 2224/7598; H01L 2224/92125; H01L 2224/92127; H01L 2224/95; H01L 2224/95001; H01L 2224/96; H01L 23/18; H01L 23/5283; H01L 23/538; H01L 23/5384; H01L 23/62; H01L 24/96; H01L 25/071; H01L 2924/00013; H01L 2924/01027; H01L 2924/15156; G01D 21/02; G01D 11/245; G01D 5/24; G01D 21/00; G01D 18/00; G01D 11/30; G01D 5/2417; G01D 5/268; G01D 3/08; G01D 11/00; G01D 3/036; G01D 11/24; G01D 5/12; G01D 5/35312; G01D 5/145; G01D 5/16; G01D 18/008; G01D 5/14; G01D 3/0365; G01D 3/022; G01D 11/26; G01D 3/028; G01D 5/266; G01D 5/2412; G01D 5/241; G01D 5/20; G01D 5/243; G01D 2218/10; G01D 9/005; G01D 5/2405; G01D 3/02; G01D 5/142; G01D 5/147; G01D 5/35316; G01D 5/35303; G01D 5/353; G01D 5/26; G01D 5/35361; G01D 5/48; G01D 5/00; G01D 5/185; G01D 18/006; G01D 5/2403; G01D 5/34; G01D 5/35306; G01D 11/10; G01D 2205/26; G01D 5/2053; G01D 5/56; G01D 5/30; G01D 3/024; G01D 3/032; G01D 5/35387; G01D 5/2006; G01D 2205/22; G01D 5/2013; G01D 5/58; G01D 1/16; G01D 5/35358; G01D 5/2046; G01D 5/35383; G01D 5/3539; G01D 1/18; G01D 11/16; G01D 3/10; G01D 1/00; G01D 5/2026; G01D 5/35367; G01D 5/24461; G01D 7/005; G01D 9/007; G01D 18/002; G01D 18/004; G01D 5/38; G01D 5/165; G01D 2205/773; G01D 3/021; G01D 5/35354; G01D 3/00; G01D 5/24466; G01D 5/2448; G01D 5/285; G01D 5/35374; G01D 11/305; G01D 5/2066; G01D 5/202; G01D 15/00; G01D 5/183; G01D 5/264; G01D 5/35345; G01D 1/14; G01D 5/02; G01D 5/244; G01D 2205/40; G01D 5/245; G01D 7/00

See application file for complete search history.

(56) References Cited

U.S. PATENT DOCUMENTS

| | | | | |
|---|---|---|---|---|
| 9,780,644 | B1 * | 10/2017 | Tapadia | H03K 19/0016 |
| 9,922,684 | B2 | 3/2018 | Pedersen et al. | |
| 10,162,399 | B2 * | 12/2018 | Atkinson | G06F 1/26 |
| 10,445,227 | B2 | 10/2019 | Tsutsui | |
| 10,802,736 | B2 | 10/2020 | Shin et al. | |
| 11,815,981 | B2 * | 11/2023 | Venkatasubramanian | G06F 1/3296 |
| 2008/0054724 | A1 * | 3/2008 | Hosomi | H02J 1/08<br>307/69 |
| 2009/0204831 | A1 | 8/2009 | Cousson et al. | |
| 2011/0320835 | A1 * | 12/2011 | Browning | G06F 1/3296<br>713/320 |
| 2015/0155860 | A1 | 6/2015 | Park et al. | |
| 2021/0368625 | A1 | 11/2021 | Matsumoto et al. | |
| 2024/0200980 | A1 * | 6/2024 | Poli | G01D 3/036 |
| 2025/0333296 | A1 * | 10/2025 | Hänsler | G01R 33/0286 |

FOREIGN PATENT DOCUMENTS

| | | | | |
|---|---|---|---|---|
| JP | 2025086580 A | * | 6/2025 | |
| WO | WO-2012006028 A2 | * | 1/2012 | G06F 1/3296 |

* cited by examiner

MICROELECTROMECHANICAL SENSOR DEVICE WITH IMPROVED POWER CONSUMPTION

BACKGROUND

Technical Field

The present disclosure relates to a microelectromechanical (MEMS) sensor device, with improved power consumption.

Description of the Related Art

In a known manner, there are several applications of MEMS sensor devices, defined as "ultra low power" applications, in which an extremely low power consumption is desired, for example, in mobile apparatuses, in particular wearable or hearable apparatuses, such as electronic watches or bands or bracelets, earphones, smart contact lenses, smart pens or the like.

One problem affecting MEMS sensor devices in such applications is represented by the power consumption while in power-on but inactive state (i.e., which occurs when the same sensor devices are not in the operating phase, for data acquisition and/or processing).

With respect to these MEMS sensor devices (such as for example accelerometers, gyroscopes, pressure sensors, etc.), commonly used in the aforementioned applications having low power consumption, it is known that a part of the power consumption is given by the electronic circuitry, known as ASIC (Application Specific Integrated Circuit), associated with a corresponding micromechanical detection structure, the latter configured for the detection of the quantity(ies) of interest (for example, acceleration, angular speed, pressure, etc.).

In particular, in the inactive condition, it is known that the consumption of the aforementioned electronic circuitry is mainly due to leakage currents.

Minimization of these leakage currents, whose value may vary also in a significant manner, for example, as a function of temperature, voltage or manufacturing process, thus represents an important constraint in the design of MEMS sensor devices, in particular in the aforementioned low-power consumption applications.

A solution that has been proposed to reduce power consumption provides for a so-called multi-domain (or multi-voltage) approach according to which the aforementioned electronic circuitry is divided into a certain number of separate domains (or independent portions), each one of which may be selectively powered, even at different voltages, such as to have the possibility of switching-off (deactivating) one or more of these domains, with a consequent power saving in the inactive condition.

In particular, to reduce power consumption, propagation delays and area occupation, a digital or logic part of the aforementioned electronic circuitry is usually powered with a voltage having a lower value with respect to the power supply voltage provided from the outside (for example by a battery), using voltage regulators that allow an under-regulated voltage to be generated starting from the external power supply voltage.

However, the aforementioned multi-domain approach utilizes power supply switches, associated with the aforementioned domains and controlled to selectively activate/deactivate the provision of the respective power supply voltage to the respective domains.

These power supply switches may be implemented externally to the MEMS sensor devices, with a consequent increase in the circuit complexity and in the size occupation and also with a control burden by the external processor (application or host processor) of the electronic apparatus wherein the same MEMS sensor devices are housed.

As an alternative, the power supply switches may be implemented, in an embedded manner, within the MEMS sensor devices, in the corresponding electronic circuitry.

However, in this case, the logic that controls these power supply switches, which is implemented in the digital part of the electronic circuitry, is always powered, even in inactive conditions, with a consequent power consumption which may not be negligible, in particular due to the aforementioned voltage regulator (which provides the under-regulated power supply voltage to the digital part).

In general, the need is certainly felt to further optimize power consumption of the MEMS sensor devices, in the inactive condition.

BRIEF SUMMARY

Various embodiments of the present disclosure solve, at least in part, the previously highlighted problems and to meet the aforementioned need.

According to the present disclosure, a microelectromechanical sensor device and a corresponding method are provided. The microelectromechanical sensor device has a detection structure and an associated electronic circuitry. The electronic circuitry receives, when the microelectromechanical sensor device is powered, an external power supply voltage and is provided with a voltage regulator which generates a regulated voltage having a different value from the external power supply voltage and at least one voltage domain powered by the regulated voltage. The electronic circuitry has a power supply management core, always powered by the external power supply voltage and controlling the voltage regulator to interrupt power supply to the voltage domain and implement a first power-down condition of the microelectromechanical sensor device.

BRIEF DESCRIPTION OF THE SEVERAL VIEWS OF THE DRAWINGS

For a better understanding of the present disclosure, various embodiments thereof is now described, purely by way of non-limiting example and with reference to the attached drawings, wherein.

DETAILED DESCRIPTION

As will be described in detail in the following, according to an aspect of the present solution, at least two different and distinct voltage domains (i.e., distinct portions powered at different voltages) are implemented in the electronic circuitry of a microelectromechanical sensor (MEMS) device: a first domain, which defines an always-on core in the presence of an external power supply voltage (coming from the outside of the microelectromechanical sensor device) and is powered by the same external power supply voltage; and at least one second domain, which is powered by a voltage regulator at a voltage that is different from, in particular lower than, the external power supply voltage, and may be selectively switched into an on- or off-condition by the aforementioned always-on core.

In particular, a so-called deep power-down condition may be implemented in the microelectromechanical sensor device, by powering off the voltage regulator and the associated voltage domains, in particular the aforementioned second domain. In this deep power-down condition, the power consumption is extremely low (of the order of at most a few tens of nA), being associated with the electrical consumption of the aforementioned always-on core and not from other components of the microelectromechanical sensor device 1.

The always-on core is also configured to manage the transition between the aforementioned deep power-down condition and a different inactive condition, defined herein as a soft power-down condition, during which the aforementioned voltage regulator is powered on.

In this soft power-down condition, most of the circuit stages of the microelectromechanical sensor device are switched to the inactive state in order to reduce the energy consumption, by means of a switching control logic powered by the aforementioned voltage regulator. In this condition, therefore, the leakage of the aforementioned control logic affects the power consumption, together with the quiescent consumption of the same voltage regulator.

Figure 1:
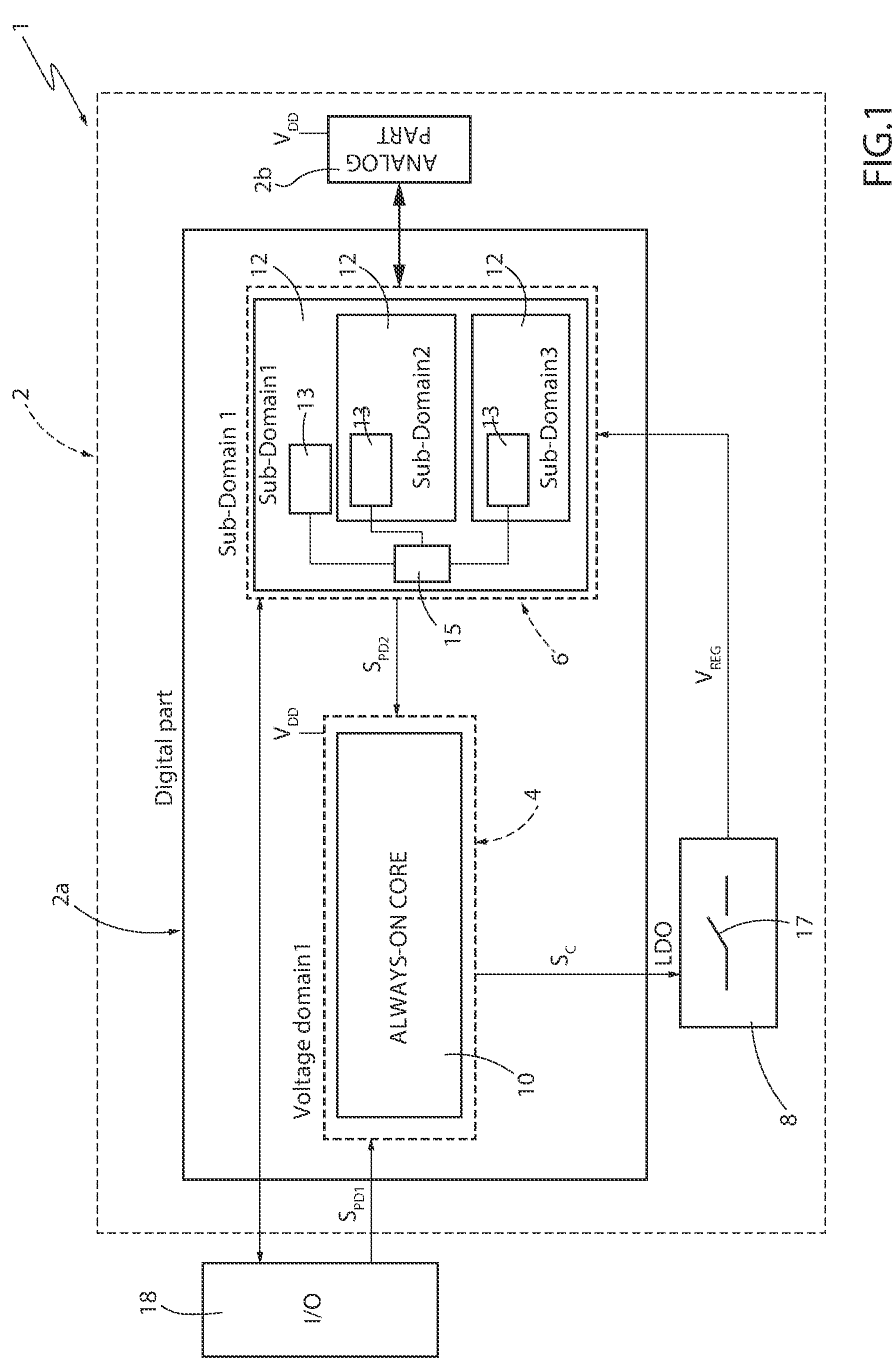
FIG. 1 is a block diagram of the electronic circuitry of a microelectromechanical sensor device, according to an embodiment of the present solution.

FIG. 1 schematically shows the architecture of a microelectromechanical sensor device 1, according to an embodiment of the present solution.

The microelectromechanical sensor device 1 comprises, in a known manner, a micromechanical detection structure (not shown here), configured to sense one or more detection quantities; and an electronic circuitry 2, operatively coupled to the micromechanical detection structure and configured to receive and process the aforementioned detection quantity.

In particular, this electronic circuitry 2 comprises a digital part 2*a* and an analog part 2*b*.

The digital part 2*a* comprises, as will be clear to a person skilled in the art, logic or digital elements such as registers, timing elements, logic gates and processing modules for executing a set of logic operations (in particular in the form of algorithms); in a possible implementation, this digital part 2*a* may comprise a processing unit, such as a microcontroller, a microprocessor or a similar embedded digital processing unit.

The electronic circuitry 2 is configured to receive from outside the microelectromechanical sensor device 1, for example from a battery (not shown here) of an electronic apparatus, in particular of the portable or wearable type, in which the same microelectromechanical sensor device 1 is housed, an external power supply voltage $V_{DD}$, for example comprised between 1.71 V and 3.6 V.

According to an aspect of the present solution, the digital part 2*a* comprises a first voltage domain 4, powered by the external power supply voltage $V_{DD}$; and at least one second voltage domain 6, separate and distinct from the first voltage domain 4, powered by a regulated voltage $V_{REG}$, having a value lower than the external power supply voltage $V_{DD}$, for example equal to 1.2 V.

In particular, this regulated voltage $V_{REG}$ is generated by a voltage regulator 8, for example of the LDO (Low Drop-Out) type.

The analog part 2*b* of the electronic circuitry 2 may also be powered by the aforementioned external power supply voltage $V_{DD}$.

The first voltage domain 4 comprises an always-on core 10, which is made of a control logic of very low complexity and small size (for example a few tens of thousands of square microns), configured to manage the electric power supply mode of the microelectromechanical sensor device 1 and in particular the transition between the aforementioned deep power-down and soft power-down conditions.

The second voltage domain 6 comprises digital resources powered by the aforementioned regulated voltage $V_{REG}$, which in turn may be divided into multiple sub-domains 12, distinct from each other and selectively controllable in power-on or in power-off, as shown schematically through power supply switching elements 13, by a switching control logic 15 (also powered by the aforementioned regulated voltage $V_{REG}$). This switching control logic 15, for example, is configured to receive from the outside (for example from an application, or host, processor of the electronic apparatus wherein the microelectromechanical sensor device 1 is used) and to decode suitable commands to manage power-on of the aforementioned sub-domains 12.

In the embodiment illustrated, a main sub-domain (sub-domain 1), where the aforementioned switching control logic 15 is implemented, and a number of secondary sub-domains (in the example sub-domain 2 and sub-domain 3) are present.

In a possible embodiment, this second voltage domain 6 comprises all digital resources of the digital part 2*a* of the electronic circuitry 2, except for the (minimum) resources dedicated to implementation of the aforementioned always-on core 10 in the first voltage domain 4.

In detail, this always-on core 10 is configured to control switching-on and switching-off of the voltage regulator 8 (powering-off or powering-on) by means of a control signal $S_C$ generated by the same always-on core 10 and provided to the same voltage regulator 8; schematically, FIG. 1 shows a power-on switch 17 which, controlled by the aforementioned control signal $S_C$, powers-off (for example, with a high value of the control signal $S_C$) or powers-on (for example, with a low value of the control signal $S_C$) the voltage regulator 8, disabling or enabling generation of the regulated voltage $V_{REG}$.

In the deep power-down condition, the voltage regulator 8, and, consequently, the second voltage domain 6 (and the corresponding sub-domains 12), are powered off, deactivated, so as to minimize power consumption. In this condition, the power consumption of the electronic circuitry 2 is substantially due to the sole always-on core 10 (since the second voltage domain 6 is not powered), which, as indicated, comprises the minimum control logic such as to manage power-on of the voltage regulator 8. The power consumption in deep power-down condition is therefore very low.

The always-on core 10 is configured to manage the transition from the deep power-down condition to the soft power-down condition as a function of a first control signal $S_{PD1}$, which is received from the outside (for example from the application, or host, processor of the electronic apparatus in which the microelectromechanical sensor device 1 is used) at an input/output element (pad or pin) 18 of the microelectromechanical sensor device 1.

In particular, as will be discussed in detail below, as a function of the aforementioned first control signal $S_{PD1}$, the always-on core 10 determines power-on of the voltage regulator 8 and activation of the second voltage domain 6, in order to exit the deep power-down condition and, initially, for the implementation of the soft power-down condition.

The always-on core 10 is also configured to receive a second control signal $S_{PD2}$, as a function of which, as will be discussed in detail below, it determines power-off of the voltage regulator 8 and deactivation of the second voltage domain 6, for the implementation of the deep power-down condition.

In a possible embodiment, the always-on core 10 receives this second control signal $S_{PD2}$ (again from the outside of the microelectromechanical sensor device 1) via the second voltage domain 6, which is also coupled to the input/output element 18 of the microelectromechanical sensor device 1.

Figure 2:
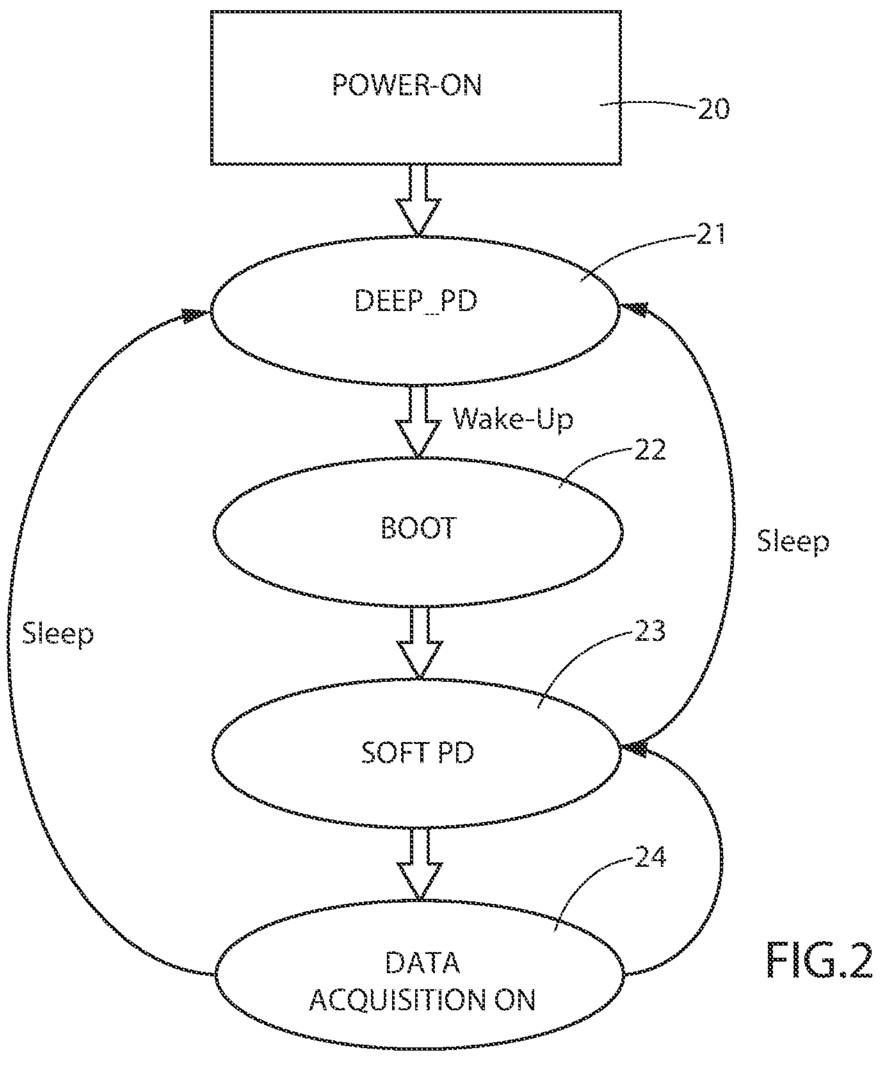
FIG. 2 is a flowchart of operations relating to the operation of the device of FIG. 1.

With reference to FIG. 2, a possible operating mode of the power supply management architecture of the microelectromechanical sensor device 1 is now described.

In detail, as shown in step 20, upon powering-on the microelectromechanical sensor device 1 (i.e., when the external power supply voltage $V_{DD}$ is provided, for example after an enabling command generated by the application or host processor), the same microelectromechanical sensor device 1 is configured to automatically enter first the deep power down (deep PD) condition, step 21, with the voltage regulator 8 which is powered-off and therefore does not provide power supply to the second voltage domain 6 (the power-on switch 17 of FIG. 1 is open).

After receiving a dedicated wake-up command, represented for example by the first control signal $S_{PD1}$ received from the outside, the always-on core 10 (powered directly by the aforementioned external power supply voltage $V_{DD}$) powers on the voltage regulator 8 and enable the supply of the regulated voltage $V_{REG}$ for powering the second voltage domain 6 (the power-on switch 17 is closed).

Then, as shown in step 22, in the same second voltage domain 6, preliminary operations are performed for retrieval of configuration and trimming information from a non-reprogrammable internal memory (of the OTP—One Time Programmable—type), which are stored in volatile memory registers, in order to carry out the so-called "boot" or restore of the microelectromechanical sensor device 1.

Once the boot phase has ended, the microelectromechanical sensor device 1 enters the soft power down (soft PD) condition, as shown in step 23.

Through the switching control logic 15 in the second voltage domain 6, activation of the respective sub-domains 12 may be managed in this condition to reduce a power consumption of the microelectromechanical sensor device 1 (as previously indicated, the switching control logic 15 may receive and decode suitable commands received for this purpose from the outside, for example from the aforementioned application processor, at the input/output element 18).

Subsequently, from this soft power down condition, the same microelectromechanical sensor device 1 may enter an operative or active (ON) condition, as shown in step 24, in which complete functionalities, for example for acquisition and processing of data (corresponding, for example, to the quantity to be sensed) are ensured.

As previously discussed, the switching control logic 15 in the second voltage domain 6 may control for this purpose one or more of the power supply switching elements 13 to activate the respective sub-domains 12 and thus ensure the corresponding operativeness.

From this active condition, the microelectromechanical sensor device 1 may return to the soft power down condition, step 23 (in which the switching control logic 15 may possibly interrupt the power supply of one or more of the aforementioned sub-domains 12).

Furthermore, from the soft power down condition, or from the active condition, the microelectromechanical sensor device 1 may be brought back to the deep power down condition, step 21.

In particular, upon receiving a dedicated power-down or sleep command, represented for example by the second control signal $S_{PD2}$ (received from the second voltage domain 6 which in turn receives a corresponding command from the outside, for example from the application or host processor), the sub-domains 12 are powered off (if they were still on) and then the always-on core 10 powers off the voltage regulator 8, again interrupting the power supply to the aforementioned second voltage domain 6.

The operation described is also illustrated with reference to the timing diagrams shown in FIG. 3, referring to entering from a deep PD condition (for example immediately following the power-on or activation of the microelectromechanical sensor device 1) into a soft power down condition (after receiving the aforementioned dedicated wake-up sequence, wake-up command).

Figure 3:
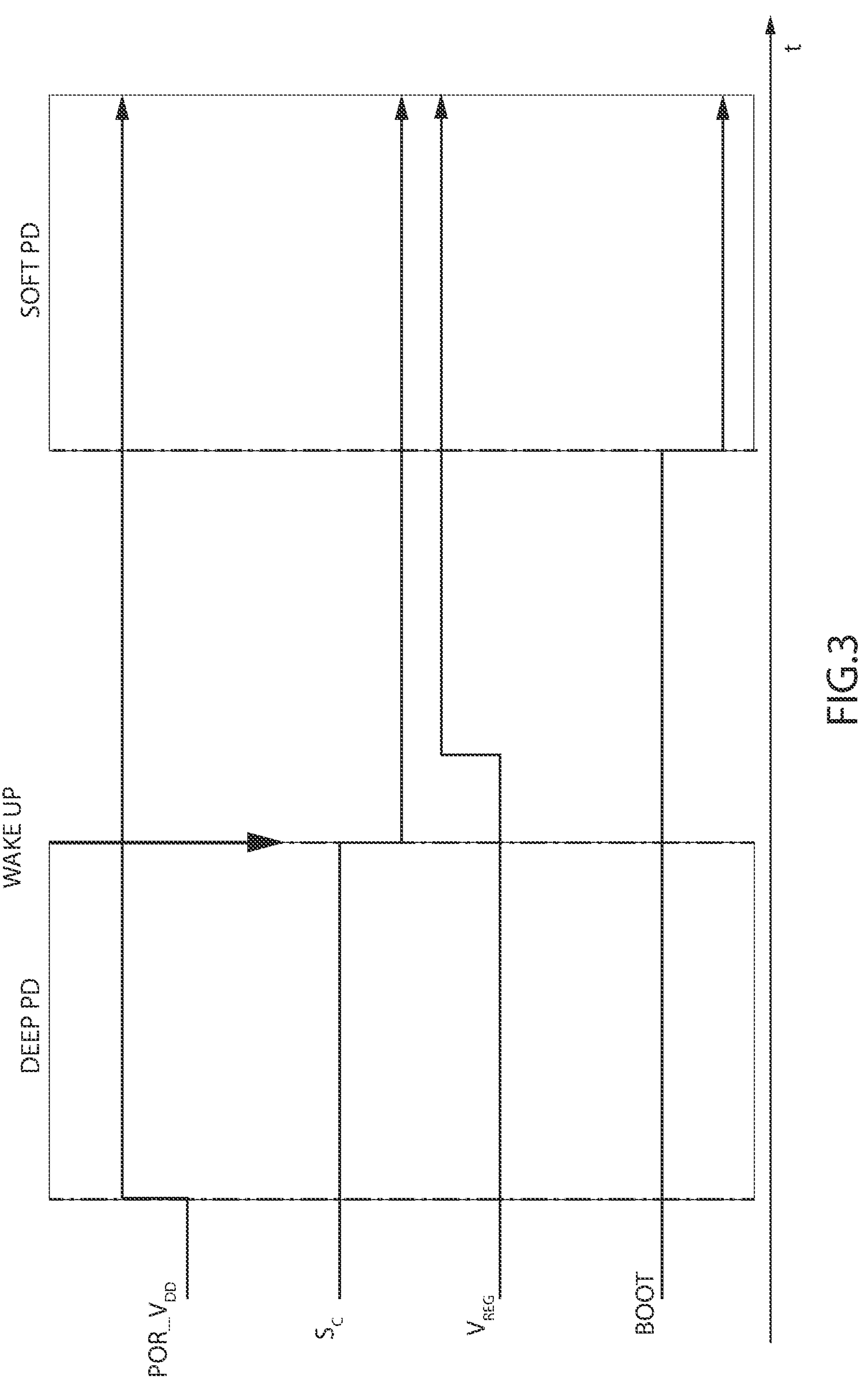
FIG. 3 shows timings of signals inherent to the operations shown in FIG. 2.

In particular, as shown in this FIG. 3, after the external power supply voltage $V_{DD}$ is enabled (as represented by a power-on reset signal POR_$V_{DD}$), the deep power down condition is immediately activated, exit from which is then implemented upon the arrival of the dedicated wake-up sequence (as indicated by the arrow).

This dedicated wake-up sequence entails in particular the power-on of the voltage regulator 8 (the control signal $S_C$ goes to the low state) and the subsequent enabling of the regulated voltage $V_{REG}$ generated by the same voltage regulator 8.

At the end of the consequent restore operations (boot), the microelectromechanical sensor device 1 enters the soft power down condition, which will then evolve into the normal operativeness of the same device or, alternatively, again into the deep power down condition (as previously described and not illustrated in the aforementioned FIG. 3).

Figure 4:
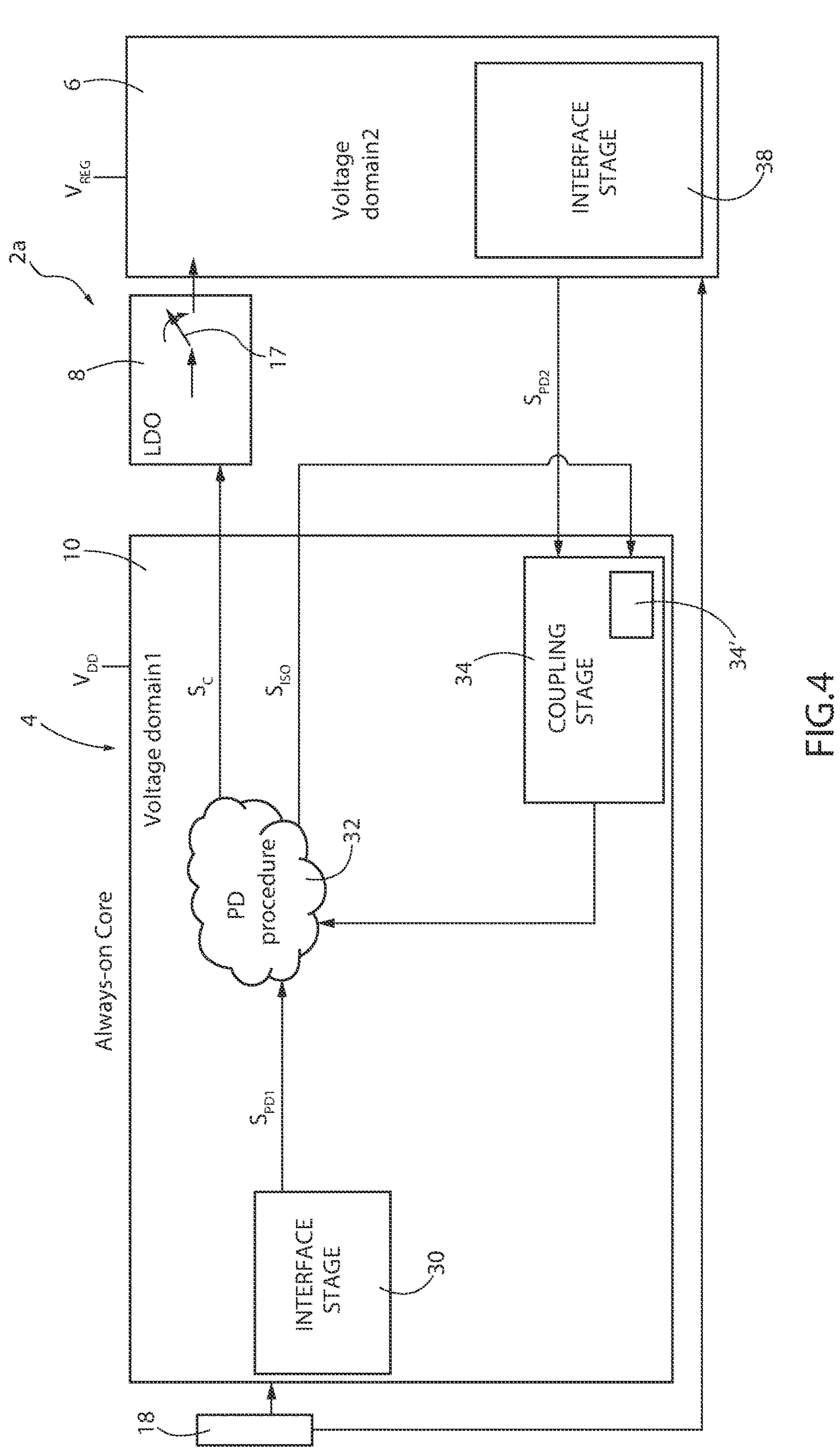
FIG. 4 is a more detailed block diagram of the electronic circuitry of the microelectromechanical sensor device.

With reference to FIG. 4, a possible implementation of the aforementioned architecture of the microelectromechanical sensor device 1 is now described in more details.

In this embodiment, the always-on core 10 comprises an interface stage 30, coupled to the input/output element 18 of the microelectromechanical sensor device 1 to receive the aforementioned first control signal $S_{PD1}$.

In a possible implementation, this interface stage 30 implements a serial interface, of the I2C (I3C)/SPI type; and the input/output element 18 is coupled to a serial bus interposed between the application or host processor and the microelectromechanical sensor device 1.

The always-on core 10 further comprises: a soft power-down procedure stage 32, having a first input coupled to the interface stage 30 and a second input; and a coupling stage 34, interposed between the second voltage domain 6 and the same soft power-down procedure stage 32, having a respective input coupled to the second voltage domain 6 and an output coupled to the second input of the soft power-down procedure stage 32.

This coupling stage 34, in a manner not shown in detail, comprises level shifter elements and/or synchronization elements, configured to put in communication the first and second voltage domains 4, 6, which work at different voltages and are not synchronized with each other. Isolation cells 34' are also present at the input of the coupling stage 34, in order to isolate, under certain operating conditions, the first voltage domain 4 from the second voltage domain 6.

In detail, the soft power-down procedure stage 32 is configured to receive, at the first input, the first control signal $S_{PD1}$, as a function of which it enables the voltage regulator 8, through the control signal $S_C$. As a function of the same first control signal $S_{PD1}$, the soft power-down procedure stage 32 also generates a control signal $S_{ISO}$ to disable the isolation cells 34' of the coupling stage 34 (which are active during the deep power down condition).

As previously indicated, the first control signal $S_{PD1}$ carries the aforementioned wake-up sequence, which determines the transition between the deep and soft power-down conditions.

For example, in the event that the interface stage 30 implements an SPI serial interface, the first control signal $S_{PD1}$ may entail writing a dedicated wake-up bit, using a standard-type SPI writing operation, for example performed at a clock frequency of 10 MHZ. In a possible implementation, a high logic value '1' of the aforementioned wake-up bit (similarly, of the first control signal $S_{PD1}$) may determine waking up from the deep PD condition.

In the event that the interface stage 30 implements a I2C/I3C serial interface, the first control signal $S_{PD1}$ may assume the following sequence: Start+Static Address+Nack, for the aforementioned waking up from the deep power down condition.

The command for maintaining the deep power down condition may be, in both cases, a wake-up bit (similarly, the first control signal $S_{PD1}$) set to a low logic level '0'.

The same soft power-down procedure stage 32 is configured to receive, at the second input, the second control signal $S_{PD2}$, coming from the second voltage domain 6 through the coupling stage 34.

The aforementioned second voltage domain 6 has a respective interface stage 38, for example of the I2C(I3C)/SPI serial type, which couples to the input/output element 18 (and to the corresponding serial bus), to receive from the outside, for example from the application or host processor, the aforementioned power-down or sleep command, which determines the return to the deep power down condition.

As a function of the same second control signal $S_{PD2}$, the soft power-down procedure stage 32 enables again the isolation cells 34' of the coupling stage 34 (through the aforementioned control signal $S_{ISO}$) and also deactivates the voltage regulator 8 (through the aforementioned control signal $S_C$).

As previously indicated, the always-on core 10 has functionalities reduced to a minimum, to minimize area and consumption and leakage currents during the deep power down condition. For this reason, the aforementioned interface stage 30 is configured to recognize only the first control signal $S_{PD1}$; the second control signal $S_{PD2}$ is in fact received and recognized by the respective interface stage 38 of the second voltage domain 6.

In particular, the interface stage 30 of the always-on core 10 implements a slave interface (in the example of the I2C, I3C or SPI serial type) with reduced functionality, in particular limited to the ability to write in an internal register as a function of the aforementioned first control signal $S_{PD1}$ received from the outside, so as not to degrade the performances of the interface timings, which are more critical during reading operations. The same interface stage 30 of the always-on core 10 is not able to perform any other writing operation, nor any reading operation.

The various stage discussed herein are, for example, circuitry of the electronic circuitry 2.

The advantages of the proposed solution are clear from the preceding description.

In any case, it is emphasized that the introduction of the control logic of the always-on core 10, to implement a first (deep) power down condition and the transition between the same deep power down condition and a second, different, (soft) power down condition, allows the power consumption of the microelectromechanical sensor device 1 to be reduced, which is due in particular to the leakage currents in the inactive condition.

Tests and simulations performed by the Applicant have, for example, shown the possibility of obtaining power consumption in a deep power down condition of the order of a few tens of nA (for example around 20 nA), as compared to a consumption, in a soft power down condition, of some μA (for example around 2 μA), therefore two orders of magnitude lower.

Furthermore, the solution described provides for an automatic approach that does not require any additional intervention by the user or the host application, as regards management of power supply domains.

The same solution is advantageously completely embedded in the microelectromechanical sensor device 1, without requiring elements external to the same microelectromechanical sensor device, for example power supply management switches.

The solution described is therefore particularly advantageous for use in applications which require particularly low power consumptions, powered by a battery, such as for example in mobile electronic apparatuses, in particular wearable or hearable apparatuses, such as electronic watches or bands or bracelets, earphones, smart contact lenses, smart pens or similar.

Figure 5:
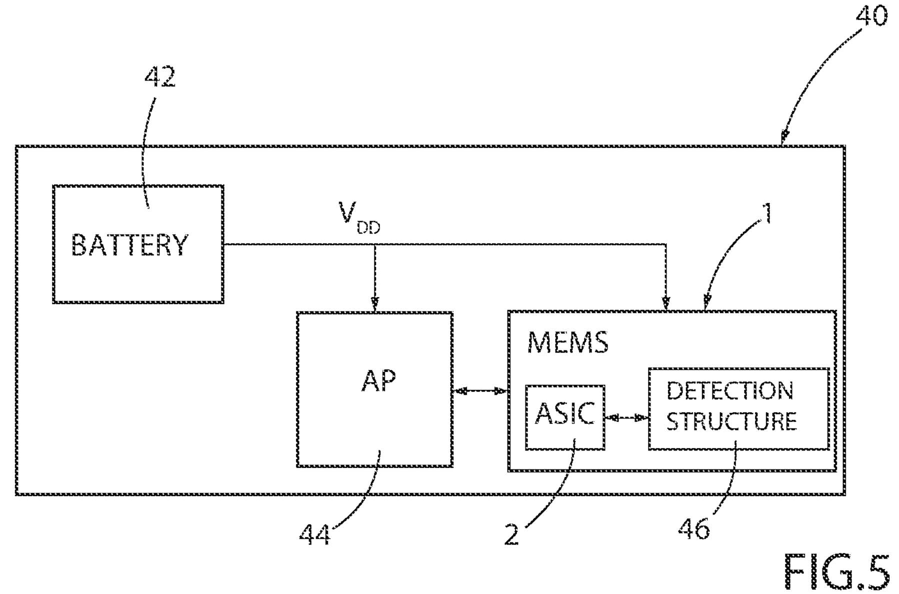
FIG. 5 is a schematic block diagram of an electronic apparatus wherein the microelectromechanical sensor device may be used.

In this regard, FIG. 5 schematically shows an electronic apparatus 40, in particular of the mobile or wearable type, powered by a battery 42.

The electronic apparatus 40 comprises a main control unit 44 (representing the aforementioned application or host processor), operatively coupled to the microelectromechanical sensor device 1 and configured to provide power supply management instructions to the power supply management core 10 (in the form of the aforementioned first and second control signals $S_{PD1}$, $S_{PD2}$).

The same microelectromechanical sensor device 1 comprises the electronic circuitry 2 and furthermore a micromechanical detection structure 46 associated therewith.

Finally, it is clear that modifications and variations may be made to what has been described and illustrated herein without thereby departing from the scope of the present disclosure.

In particular, it is emphasized that the aforementioned first power-down control signal $S_{PD1}$ received at the input/output element 18 may alternatively be an interrupt signal, the same input/output element 18 being for example associated with a global input/output terminal of the microelectromechanical sensor device 1.

In this case, a specific value, for example a high logic value '1', of the aforementioned interrupt signal may entail transition from the deep power down condition to the soft power down condition.

Such a solution may advantageously allow a cascade connection of multiple in microelectromechanical sensor devices, referred to a single application or host processor, which may provide a first interrupt, which in this case may be retransmitted to the subsequent cascade-connected devices.

A microelectromechanical sensor device (1), may be summarized as including a detection structure (46) and an associated electronic circuitry (2); wherein said electronic circuitry (2) is configured to receive, when said microelectromechanical sensor device (1) is powered, an external power supply voltage ($V_{DD}$) and comprises a voltage regulator (8) configured to generate a regulated voltage ($V_{REG}$) having a different value from said external power supply voltage ($V_{DD}$) and at least one voltage domain (6) powered by said regulated voltage ($V_{REG}$), characterized in that said electronic circuitry (2) comprises a power-supply management core (10), always powered by said external power supply voltage ($V_{DD}$) and configured to control said voltage regulator (8) so as to interrupt power supply to said voltage domain (6) and implement a first power-down condition of said microelectromechanical sensor device (1).

The electronic circuitry (2) may include a digital part (2*a*) and an analog part (2*b*), said digital part (2*a*) including said power supply management core (10) and said voltage domain (6); and wherein, during said first power-down condition, said power supply management core (10) is the only portion of said digital part (2*a*) of the electronic circuitry (2) being electrically powered.

The power supply management core (10) may be configured to manage a transition between said first power-down condition and a second power-down condition of said microelectromechanical sensor device (1) wherein said voltage regulator (8) is enabled to power said voltage domain (6) by means of said regulated voltage ($V_{REG}$); said first and second power-down conditions being associated with absence of data acquisition and/or processing by said microelectromechanical sensor device (1).

The voltage domain (6) may include digital resources powered by said regulated voltage ($V_{REG}$) divided into a number of sub-domains (12), distinct from each other and selectively controllable in power-on or power-off by a switching control logic (15); wherein, during said second power-down condition, said switching control logic (15) is configured to interrupt power supply to one or more of said sub-domains (12) to reduce a power consumption of said microelectromechanical sensor device (1).

The power supply management core (10) may be made of a control logic comprising: an interface stage (30) configured to receive from outside of said microelectromechanical sensor device (1) a first power-down control signal ($S_{PD1}$); and a soft power-down procedure stage (32) configured to generate a control signal ($S_C$) to enable or disable said voltage regulator (8) as a function of said first power-down control signal ($S_{PD1}$).

The interface stage (30) may include digital resources enabled to receive and interpret only said first power-down control signal ($S_{PD1}$) and not enabled to perform any further writing or reading operation.

The power supply management core (10) may be configured to manage said transition as a function of said first control signal ($S_{PD1}$); and wherein said first power-down condition is automatically implemented upon powering-on of said microelectromechanical sensor device (1), corresponding to the supply of said external power supply voltage ($V_{DD}$) from outside of said microelectromechanical sensor device (1).

The power supply management core (10) may be configured to receive a second power-down control signal ($S_{PD2}$) and to enable again said first power-down condition as a function of said second control signal ($S_{PD2}$).

the voltage domain (6) may include a respective interface stage (38) configured to receive power supply management instructions from outside of said microelectromechanical sensor device (1) and provide said second power-down control signal ($S_{PD2}$) to said power supply management core (10) as a function of said power supply management instructions.

The power supply management core (10) may include a coupling stage (34), interposed between said voltage domain (6) and said soft power-down procedure stage (32) and configured to receive said second power-down control signal ($S_{PD2}$) from the interface stage (38) of said voltage domain (6); and wherein said soft power-down procedure stage (32) may be configured to generate a control signal ($S_{ISO}$) to enable isolation cells of the coupling stage (34) during at least said first power-down condition and disable said isolation cells of the coupling stage (34) during said second power-down condition.

An electronic apparatus (40) of the mobile or wearable type, may be summarized as including a battery (42), a control unit (44) and the microelectromechanical sensor device (1) according to any of the embodiments discussed above; wherein said battery (42) is configured to generate said external power supply voltage ($V_{DD}$) and said control unit (44) is configured to generate power supply management instructions for said power supply management core (10).

A power supply management method for a microelectromechanical sensor device (1) may be summarized as including a detection structure (46) and an associated electronic circuitry (2); wherein said electronic circuitry (2) is configured to receive, when said microelectromechanical sensor device (1) is powered, an external power supply voltage ($V_{DD}$) and comprises a voltage regulator (8) configured to generate a regulated voltage ($V_{REG}$) having a different value from said external power supply voltage ($V_{DD}$) and a voltage domain (6) powered by said regulated voltage ($V_{REG}$), characterized by controlling said voltage regulator (8) to interrupt power supply to said voltage domain (6) to implement a first power-down condition of said microelectromechanical sensor device (1).

The method may further include managing a transition between said first power-down condition and a second power-down condition of said microelectromechanical sensor device (1) wherein said voltage regulator (8) is enabled to power said voltage domain (6) by means of said regulated voltage ($V_{REG}$); said first and second power-down conditions being associated with absence of data acquisition and/or processing by said microelectromechanical sensor device (1).

The method may include: automatically implementing said first power-down condition upon powering-on of said microelectromechanical sensor device (1), corresponding to the supply of said external power supply voltage ($V_{DD}$); receiving a first power-down control signal ($S_{PD1}$) from outside of said microelectromechanical sensor device (1); and managing said transition as a function of said first power-down control signal ($S_{PD1}$).

The method may further include: receiving a second power-down control signal; and enabling again said first power-down condition as a function of said second power-down control signal ($S_{PD2}$).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A microelectromechanical sensor device, comprising:

a detection structure; and electronic circuitry coupled to the detection structure, the electronic circuitry configured to receive, in a case where the microelectromechanical sensor device is powered, an external power supply voltage, the electronic circuitry including:

a voltage regulator configured to generate a regulated voltage having a different value from the external power supply voltage;

at least one voltage domain configured to be powered by the regulated voltage; and a power supply management core configured to be always powered by the external power supply voltage in the case where the microelectromechanical sensor device is powered, and configured to control the voltage regulator so as to interrupt power supply to the at least one voltage domain and implement a first power-down condition of the microelectromechanical sensor device.

2. The microelectromechanical sensor device according to claim 1, wherein the electronic circuitry includes a digital part and an analog part, the digital part including the power supply management core and the at least one voltage domain, and wherein, during the first power-down condition, the power supply management core is the only portion of the digital part of the electronic circuitry being electrically powered.

3. The microelectromechanical sensor device according to claim 1, wherein the power supply management core is configured to manage a transition between the first power-down condition and a second power-down condition of the microelectromechanical sensor device in which the voltage regulator is enabled to power the at least one voltage domain with the regulated voltage, the first and second power-down conditions being associated with absence of data acquisition or processing by the microelectromechanical sensor device.

4. The microelectromechanical sensor device according to claim 3, wherein the at least one voltage domain includes digital resources powered by the regulated voltage divided into a number of sub-domains, distinct from each other and selectively controllable in power-on or power-off by a switching control logic, and wherein, during the second power-down condition, the switching control logic is configured to interrupt power supply to one or more of the sub-domains to reduce a power consumption of the microelectromechanical sensor device.

5. The microelectromechanical sensor device according to claim 3, wherein the power supply management core includes a control logic including:

an interface stage configured to receive, from outside of the microelectromechanical sensor device, a first power-down control signal; and a soft power-down procedure stage configured to generate a control signal to enable or disable the voltage regulator as a function of the first power-down control signal.

6. The microelectromechanical sensor device according to claim 5, wherein the interface stage includes digital resources enabled to receive and interpret the first power-down control signal and not enabled to perform any further writing or reading operation.

7. The microelectromechanical sensor device according to claim 5, wherein the power supply management core is configured to manage the transition as a function of the first power-down control signal; and wherein the first power-down condition is automatically implemented upon powering-on of the microelectromechanical sensor device, corresponding to supply of the external power supply voltage from outside of the microelectromechanical sensor device.

8. The microelectromechanical sensor device according to claim 7, wherein the power supply management core is configured to receive a second power-down control signal and to enable again the first power-down condition as a function of the second power-down control signal.

9. The microelectromechanical sensor device according to claim 8, wherein the at least one voltage domain includes a respective interface stage configured to receive power supply management instructions from outside of the microelectromechanical sensor device, and provide the second power-down control signal to the power supply management core as a function of the power supply management instructions.

10. The microelectromechanical sensor device according to claim 9, wherein the power supply management core includes:

a coupling stage interposed between the at least one voltage domain and the soft power-down procedure stage, and configured to receive the second power-down control signal from the interface stage of the at least one voltage domain, and wherein the soft power-down procedure stage is configured to generate a control signal to enable isolation cells of the coupling stage during at least the first power-down condition, and disable the isolation cells of the coupling stage during the second power-down condition.

11. An electronic apparatus, comprising:

a battery configured to generate an external power supply voltage;

a microelectromechanical sensor device including:

a detection structure; and electronic circuitry coupled to the detection structure, the electronic circuitry configured to receive, in a case where the microelectromechanical sensor device is powered, the external power supply voltage, the electronic circuitry including:

a voltage regulator configured to generate a regulated voltage having a different value from the external power supply voltage;

at least one voltage domain configured to be powered by the regulated voltage; and a power supply management core configured to be always powered by the external power supply voltage in the case where the microelectromechanical sensor device is powered, and configured to control the voltage regulator so as to interrupt power supply to the at least one voltage domain and implement a first power-down condition of the microelectromechanical sensor device; and a control unit configured to generate power supply management instructions for the power supply management core.

12. The electronic apparatus according to claim 11, wherein the electronic apparatus is a mobile or wearable type of electronic apparatus.

13. The electronic apparatus according to claim 11, wherein the electronic circuitry includes a digital part and an analog part, the digital part including the power supply management core and the at least one voltage domain, and wherein, during the first power-down condition, the power supply management core is the only portion of the digital part of the electronic circuitry being electrically powered.

14. The electronic apparatus according to claim 11, wherein the power supply management core is configured to manage a transition between the first power-down condition and a second power-down condition of the microelectromechanical sensor device, and wherein the voltage regulator is enabled to power the at least one voltage domain with the regulated voltage, the first and second power-down conditions being associated with absence of data acquisition or processing by the microelectromechanical sensor device.

15. The electronic apparatus according to claim 14, wherein the at least one voltage domain includes digital resources powered by the regulated voltage divided into a number of sub-domains, distinct from each other and selectively controllable in power-on or power-off by a switching control logic, and wherein, during the second power-down condition, the switching control logic is configured to interrupt power supply to one or more of the sub-domains to reduce a power consumption of the microelectromechanical sensor device.

16. The electronic apparatus according to claim 14, wherein the power supply management core includes a control logic including:

an interface stage configured to receive, from outside of the microelectromechanical sensor device, a first power-down control signal; and a soft power-down procedure stage configured to generate a control signal to enable or disable the voltage regulator as a function of the first power-down control signal.

17. A power supply management method, comprising:

receiving, by electronic circuitry of a microelectromechanical sensor device, an external power supply voltage in a case where the microelectromechanical sensor device is powered, the microelectromechanical sensor device including a detection structure coupled to the electronic circuitry, the electronic circuitry including a voltage regulator, at least one voltage domain, and a power supply management core;

generating, by the voltage regulator, a regulated voltage having a different value from the external power supply voltage;

powering, by the voltage regulator, the at least one voltage domain with the regulated voltage; and controlling, by the power supply management core, the voltage regulator to interrupt power supply to the at least one voltage domain and implement a first power-down condition of the microelectromechanical sensor device.

18. The method according to claim 17, further comprising:

managing, by the power supply management core, a transition between the first power-down condition and a second power-down condition of the microelectromechanical sensor device in which the voltage regulator is enabled to power the at least one voltage domain with the regulated voltage, the first and second power-down conditions being associated with absence of data acquisition or processing by the microelectromechanical sensor device.

19. The method according to claim 18, further comprising:

automatically implementing the first power-down condition upon powering-on of the microelectromechanical sensor device, corresponding to the supply of the external power supply voltage;

receiving, by the power supply management core, a first power-down control signal from outside of the microelectromechanical sensor device; and managing, by the power supply management core, the transition as a function of the first power-down control signal.

20. The method according to claim 19, further comprising:

receiving, by the power supply management core, a second power-down control signal; and enabling, by the power supply management core, again the first power-down condition as a function of the second power-down control signal.

* * * * *